US009268526B2

(12) United States Patent
Mints

(10) Patent No.: US 9,268,526 B2
(45) Date of Patent: *Feb. 23, 2016

(54) DUAL-BUFFER SERIALIZATION AND CONSUMPTION OF VARIABLE-LENGTH DATA RECORDS PRODUCED BY MULTIPLE PARALLEL THREADS

(71) Applicant: International Business Machines Corporation, Armonk, NY (US)

(72) Inventor: Vitali Mints, Revere, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/490,346

(22) Filed: Sep. 18, 2014

(65) Prior Publication Data
US 2015/0006769 A1   Jan. 1, 2015

Related U.S. Application Data

(63) Continuation of application No. 13/771,588, filed on Feb. 20, 2013.

(51) Int. Cl.
G06F 3/06 (2006.01)
G06F 5/12 (2006.01)
G06F 5/10 (2006.01)

(52) U.S. Cl.
CPC .. G06F 5/12 (2013.01); G06F 5/10 (2013.01); G06F 2205/106 (2013.01); G06F 2205/126 (2013.01)

(58) Field of Classification Search
None
See application file for complete search history.

(56) References Cited

U.S. PATENT DOCUMENTS

| 5,539,896 | A  | * | 7/1996  | Lisle           | 711/150 |
|-----------|----|---|---------|-----------------|---------|
| 6,732,124 | B1 | * | 5/2004  | Koseki          |         |
| 7,698,604 | B2 |   | 4/2010  | Bartlett et al. |         |
| 8,122,168 | B2 |   | 2/2012  | Duggirala et al.|         |
| 2010/0217942 | A1 | * | 8/2010 | Kondo         | 711/154 |
| 2011/0307643 | A1 | * | 12/2011 | Coupe         | 711/5   |
| 2012/0131285 | A1 | * | 5/2012 | Leshchiner et al. | 711/147 |
| 2012/0203805 | A1 |   | 8/2012 | Lee et al.     |         |

OTHER PUBLICATIONS

IBM, "z/Architecture Principles of Operation", IBM Corporation, Tenth Edition, Sep. 2012, Total 7 pp.

(Continued)

*Primary Examiner* — Ilwoo Park
(74) *Attorney, Agent, or Firm* — Janaki K. Davda; Konrad, Raynes, Davda and Victor LLP

(57) ABSTRACT

Under control of the consumer, it is determined that a first buffer is empty and that a second buffer contains data; a first compare-double-and-swap operation within a spin loop is executed to swap a double pointer of the first buffer and a double pointer of the second buffer, wherein responsive to the executing of the operation the consumer drains the second buffer, and wherein the executing of the operation directs the at least one producer to fill the first buffer; and it is determined that the first buffer and the second buffer are empty and the consumer waits for a notification from one of i) the at least one producer and ii) a timer. Under control of the at least one producer, a second compare-double-and-swap operation within a spin loop is executed to atomically locate the first buffer and update the double pointer of the first buffer.

6 Claims, 11 Drawing Sheets

(56) References Cited

OTHER PUBLICATIONS

IBM, "z/OS MVS Programming: Assembler Services Reference, vol. 2 (IAR-XCT)", IBM Corporation, Sixteenth Edition, Sep. 2009, Total 17 pp.

U.S. Appl. No. 13/771,588, filed Feb. 20, 2013, entitled "Dual-Buffer Serialization and Consumption of Variable-Length Data Records Produced by Multiple Parallel Threads", invented by Vitali Mints, Total 35 pages.

Preliminary Amendment, dated Sep. 18, 2014, for U.S. Appl. No. 13/771,588, filed Feb. 20, 2013, invented by Vitali Mints, Total 6 pages.

Office Action, dated Nov. 6, 2014, for U.S. Appl. No. 13/771,588 (54.97), filed Feb. 20, 2013, invented by Vitali Mints et al., Total 19 pages.

Response to Office Action, dated Feb. 4, 2015, or U.S. Appl. No. 13/771,588 (54.97), filed Feb. 20, 2013, invented by Vitali Mints et al., Total 12 pages.

Wikipedia, "Double Compare and Swap", (online) retrieved from the internet on Feb. 3, 2015, at URL>http://en.wikipedia.org/wiki/Double_compare-and-swap, Total 2 pages.

Final Office Action, dated May 13, 2015, for U.S. Appl. No. 13/771,588 (54.97), filed Feb. 20, 2013, invented by Vitali Mints et al., Total 17 pages.

Response to Final Office Action, dated Aug. 12, 2015, for U.S. Appl. No. 13/771,588 (54.97), filed Feb. 20, 2013, invented by Vitali Mints et al., Total 10 pages.

Notice of Allowance, dated Oct. 5, 2015, for U.S. Appl. No. 13/771,588 (54.97), filed Feb. 20, 2013, invented by Vitali Mints et al., Total 9 pages.

\* cited by examiner though, the buffer, and looks for more work to do. If consumer sees that the other buffer is not empty, the buffer swap-drain cycle repeats until both buffers are empty, at which point the consumer becomes idle until either notified

DUAL-BUFFER SERIALIZATION AND CONSUMPTION OF VARIABLE-LENGTH DATA RECORDS PRODUCED BY MULTIPLE PARALLEL THREADS

FIELD

Embodiments of the invention relate to dual-buffer serialization and consuming of variable-length data records produced by multiple parallel threads.

BACKGROUND

In a variety of applications, data produced by multiple parallel threads (also referred to as producers or data producers) are serialized and consumed (processed or logged) by a single thread (also referred to as a consumer or data consumer).

An example of such an application is a real-time performance monitor collecting variable-length data from multiple sensors (or intercepts) installed in target threads. For example, the target threads are the threads that produce a stream of data (i.e., producers) to be monitored. A monitoring software tool ("monitor" or consumer) installs sensors (i.e., intercepts) into the desired places in the code execution path of the producers. The sensors see the data and make the data available to the monitor. In another example, the target threads produce streams of data from some sources (e.g., measuring devices) to be consumed by a recording device (i.e., a consumer). The variable-length data are serialized at some point before they are externalized by a logger. A consumer performs a serialization phase of the logger so that the data is pushed in a sequence, record by record, thru a single thread before being externalized (e.g., written to an external medium). Thus, the consumer is a single thread that performs serialization.

SUMMARY

Provided are a computer implemented method, computer program product, and system for serialized placement of data records into one of two buffers using a compare-double-and-swap operation within a spin loop executed by at least one producer and a consumer. Under control of the consumer, it is determined that a first buffer is empty and that a second buffer contains data, wherein the first buffer has a double-pointer, and wherein the second buffer has a double pointer; a first compare-double-and-swap operation within a spin loop is executed, wherein the executing includes swapping the double pointer of the first buffer and the double pointer of the second buffer, wherein responsive to the executing of the operation the consumer drains the second buffer, and wherein the executing of the operation directs at least one producer to fill the first buffer; and it is determined that the first buffer and the second buffer are empty and the consumer responsively waits for a notification from one of i) the at least one producer and ii) a timer. Under control of the at least one producer, a second compare-double-and-swap operation within a spin loop is executed, wherein executing the second compare-double-and-swap operation includes atomically locating the first buffer and updating the double pointer of the first buffer to reserve a slot for a data record in the first buffer.

BRIEF DESCRIPTION OF THE SEVERAL VIEWS OF THE DRAWINGS

In the drawings, like reference numbers represent corresponding parts throughout.

FIG. 5 is formed by FIGS. 5A and 5B.

FIG. 6 is formed by FIGS. 6A, 6B, 6C, and 6D.

DETAILED DESCRIPTION

Figure 1:
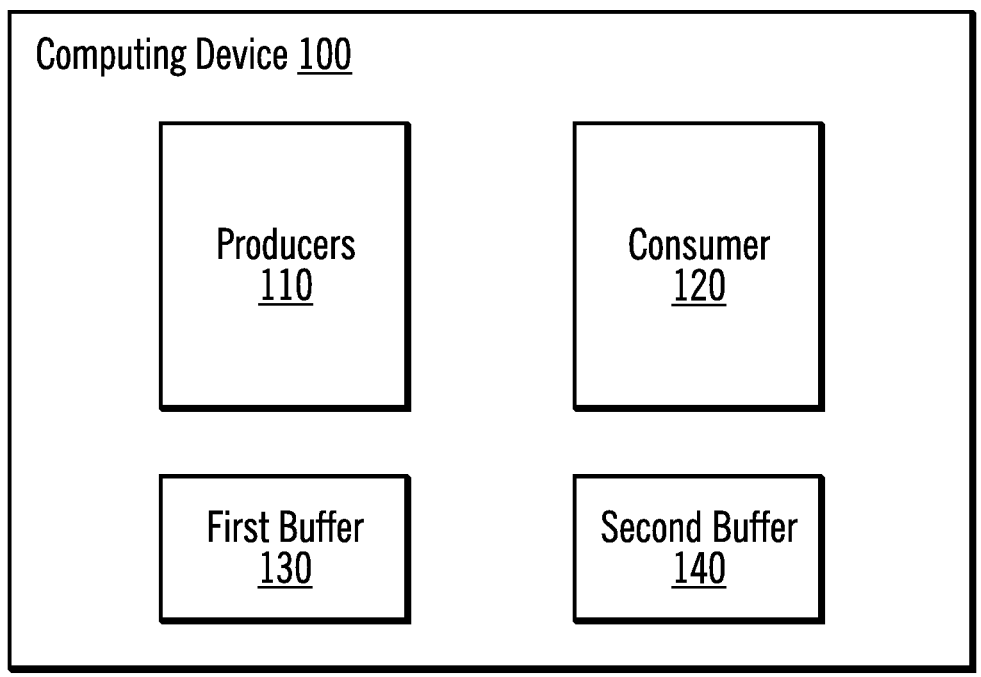
FIG. 1 illustrates, in a block diagram, a computing environment in accordance with certain embodiments.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Conventional techniques may not support variable-length records, may have individual records queued as a dynamic linked list that has pointer maintenance and storage allocation/deallocation, or may use a pre-allocated buffer for which a producer issues wait or lock requests to the operating system to resolve collision with the consumer or other producers. Embodiments of the present invention involve a recognition of these issues and provide serialization of variable-length data records produced by multiple parallel threads and consumed by a single thread, employing a dual-buffer technique. In certain embodiments, the variable-length data takes the form of variable-length data records. Initially, a first buffer is assigned to the producers and a second buffer is assigned to the consumer, wherein the first buffer has a double pointer, and wherein the second buffer has a double pointer. On the consumer side, a compare-double-and-swap operation within a spin loop is executed to swap the double pointer of the first buffer and the double pointer of the second buffer to direct a consumer to drain the second buffer and at least one producer to fill the first buffer. On the producer side, a compare-double-and-swap is executed on the double pointer to serialize data records placed in the buffer. Initially, the consumer is idle (in a wait state with a specified timer). A producer notifies the consumer when there is enough data (i.e., one or more data records) to consume. That is, when a producer decides that there are enough records in the buffer to consume, the producer notifies the consumer. In certain embodiments, the producer does not notify the consumer after each individual data record, but only when there is a meaningful amount of work to do (e.g., thousands of records). The consumer swaps the double pointers, which swaps the buffers between producers and consumer. The consumer then drains the current consumer buffer until empty, and looks for more work to do. If consumer sees that the other buffer is not empty, the buffer swap-drain cycle repeats until both buffers are empty, at which point the consumer becomes idle until either notified by a producer or a wait timer expired. The consumer idle-busy cycle repeats as long as required by an implementation. For certain implementations, the performance can be tuned by varying the buffer size, the consumer wait timer interval, and the condition when a producer must notify the consumer.

FIG. 1 illustrates, in a block diagram, a computing environment in accordance with certain embodiments. A multi-threaded or multi-processing computing device 100 includes multiple producers 110, a single consumer 120, a first buffer 130, and a second buffer 140. In certain embodiments, one of the buffers 130, 140 may be a producers buffer, while the other one of the buffers 130, 140 may be a consumer buffer. In certain embodiments, the producers are producer threads, and the consumer is a consumer thread. In certain embodiments, the producers and consumer may be part of a single program, where parts of the program may run asynchronously and on different processors.

Embodiments employ a dual buffer (with buffers 130, 140) with double pointers with a control mechanism that alternates the ownership of the buffers 130, 140 between the producers and the consumer in a way that minimizes collisions between the consumer 120 and the producers 110 without using lock requests or latches to resolve collisions. With embodiments, serialization is performed by a compare-double-and-swap operation within a spin loop or by functionally equivalent operations or instructions. Embodiments support variable-length records and have no environmental restrictions on the producers 110.

In certain embodiments, only a concurrent portion of producers and consumer code run on a same machine, which is in order for the producers and the consumer to share control of the buffers in memory that they may access in common. However, the ultimate origin of each producer's data and the ultimate destination of the consumer output data may be anything connected to that machine where the concurrent portion runs.

Figure 2:
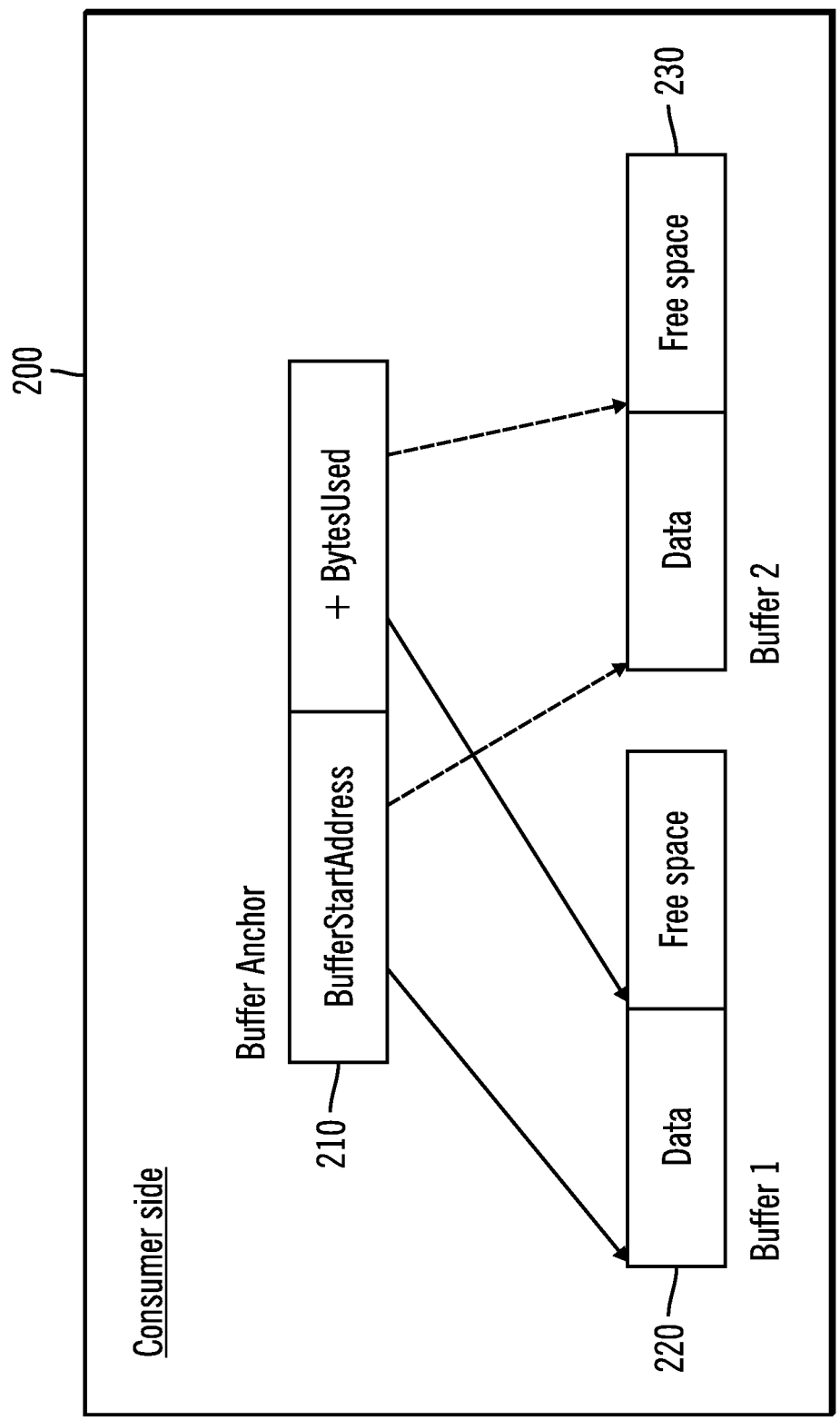
FIG. 2 illustrates an example of a buffer as viewed by a consumer in accordance with certain embodiments.

FIG. 2 illustrates an example of buffers 200 as viewed by a consumer in accordance with certain embodiments. The double pointer 210 includes a BufferStartAddress field that points to a beginning of a buffer (either Buffer 1 220 or Buffer 2 230) that is to be used by the consumer and a BytesUsed field that, added to BufferStartAddress, points to a beginning of a free area in the buffer (either Buffer 1 or Buffer 2). Thus, by changing the BufferStartAddress in the double pointer 210, one of the buffers 220, 230 is selected as the consumer buffer.

Figure 3:
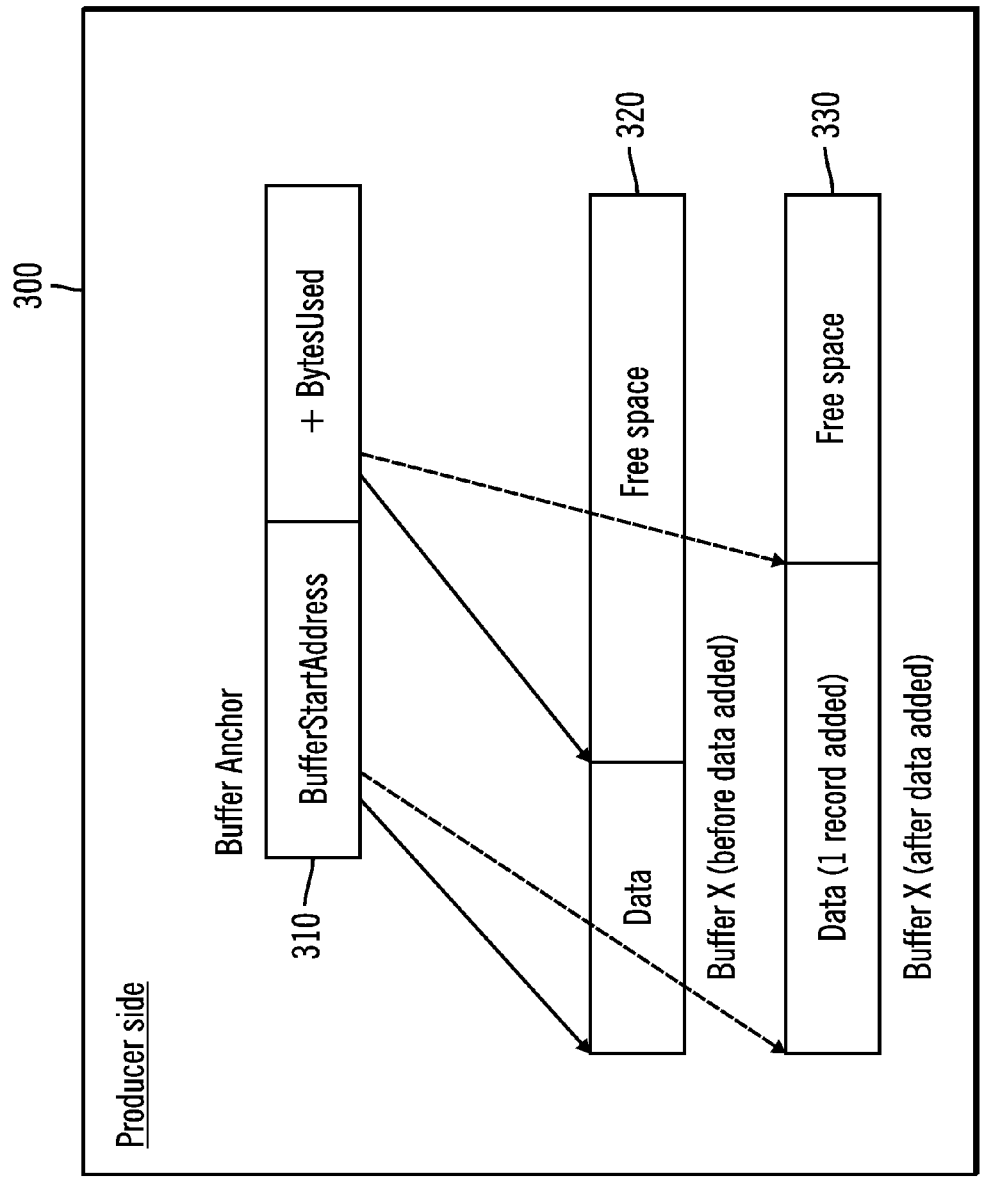
FIG. 3 illustrates an example of a buffer as viewed by a producer in accordance with certain embodiments.

FIG. 3 illustrates an example of buffers 300 as viewed by a producer in accordance with certain embodiments. The double pointer 310 includes a BufferStartAddress field that points to a beginning of a buffer (illustrated as Buffer X) and a BytesUsed field that, added to BufferStartAddress, points to a beginning of a free area in the buffer. Buffer 320 illustrates Buffer X before data is added by a producer, and buffer 330 illustrates Buffer X after data is added by the producer.

In certain embodiments, the compare-double-and-swap operation within a spin loop atomically swaps the contents of two long fields. With embodiments, the compare-double-and-swap operation within a spin loop atomically swaps double pointers on the consumer side and advances the double pointer to the free area (=BufferStartAddress+BytesUsed) on the producer side (i.e., the pointer to buffer X remains the same).

Figure 4:
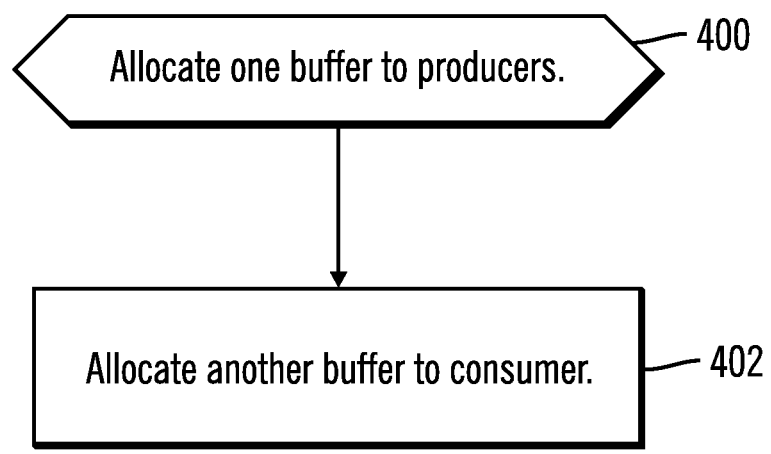
FIG. 4 illustrates, in a flow diagram, operations performed initially in accordance with certain embodiments.

FIG. 4 illustrates, in a flow diagram, operations performed initially in accordance with certain embodiments. In block 400, one buffer is allocated to the producers. Whichever of the two buffers the producers are using may be referred to as the producer buffer. In block 402, another buffer is allocated to the consumer. Whichever of the two buffers the consumer is using may be referred to as the consumer buffer.

In certain embodiments, two buffers B1, B2 of equal size in commonly-addressable storage by the producers and consumer are pre-allocated and initialized to zeros: one to the producers and the other to the consumer (e.g., Producers→B1, Consumer→B2). In certain embodiments, the double pointer is a composite field BufferAnchor containing two fullword or doubleword integers, {BufferStartAddress, BytesUsed}.

Figure 5A:
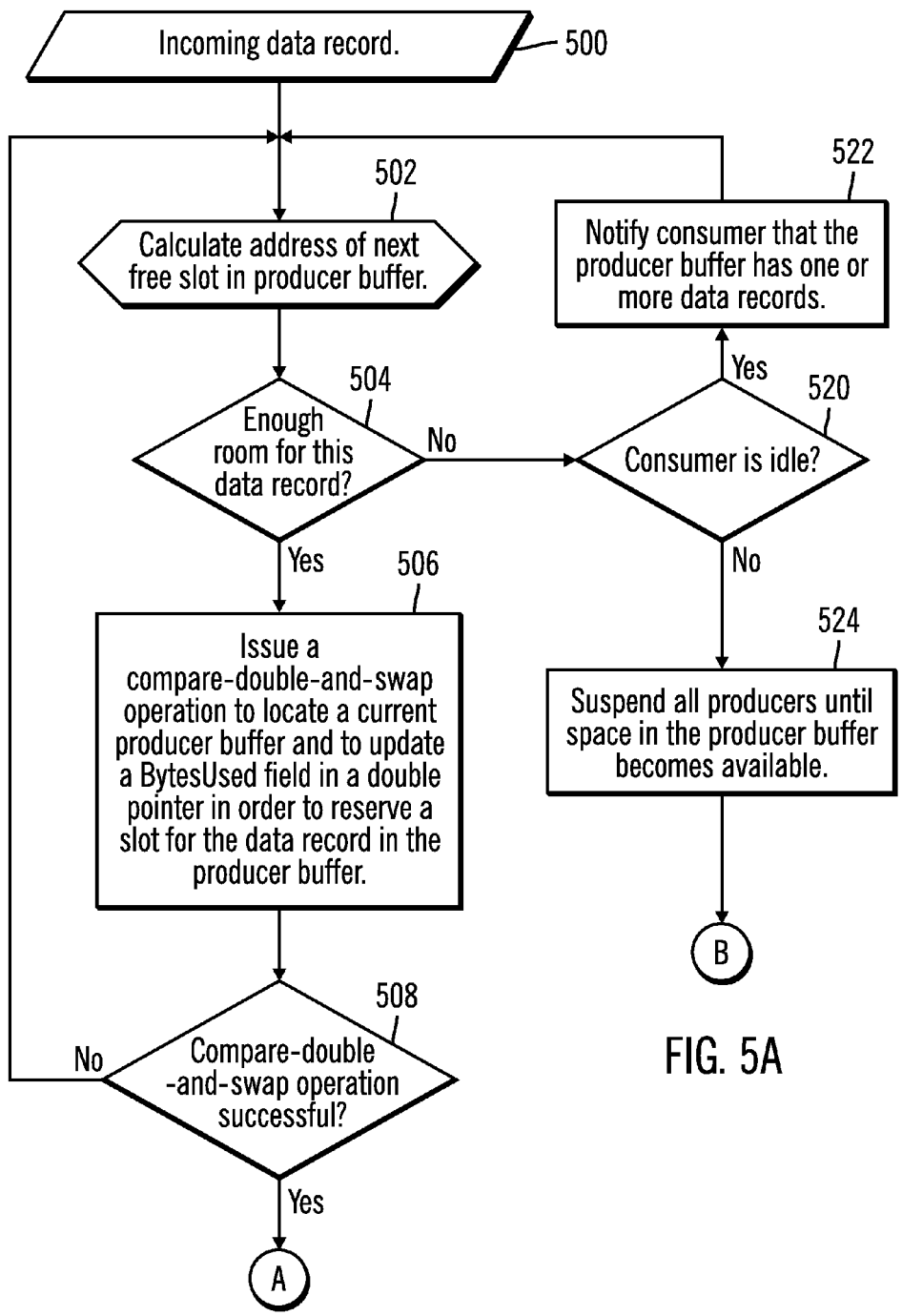
FIG. 5 illustrates, in a flow diagram, operations performed by a producer in accordance with certain embodiments.
Figure 5B:
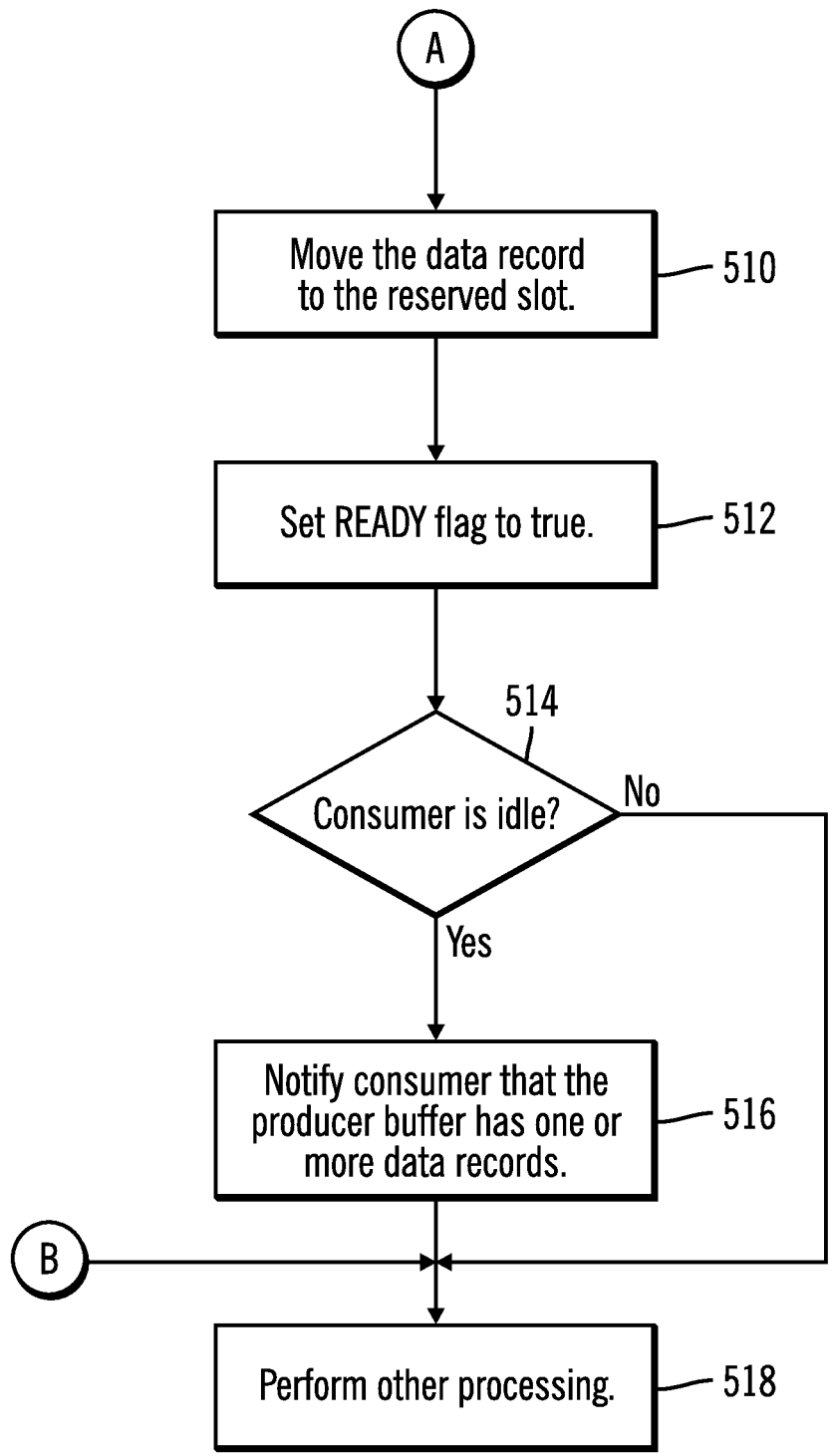

FIG. 5 illustrates, in a flow diagram, operations performed by a producer in accordance with certain embodiments. FIG. 5 is formed by FIGS. 5A and 5B. In certain embodiments, multiple producers are performing the processing of FIG. 5 in parallel. Control begins at block 500 with a data record being received by the producer. These incoming data records may be variable-length data records. In certain embodiments, each producer starts filling in the producer buffer with variable-length consecutive records, concurrently updating the ProducerBufferAnchor composite field so that: 1) a current producer buffer is located and a slot for a data record is reserved with a compare-double-and-swap operation within a spin loop updating the BytesUsed field and 2) the data record is moved to the slot.

In block 502, the producer calculates the address of a next free slot (e.g., a next free byte) in the producer buffer for storing the data record. In block 504, the producer determines whether there is enough room for the data record in the producer buffer. If so, processing continues to block 506, otherwise, processing continues to block 520.

In block 506, the producer issues a compare-double-and-swap operation to locate a current producer buffer and to update the BytesUsed field in the double pointer in order to reserve a slot for the data record in the producer buffer. That is, the producer issues a compare-double-and-swap operation to reserve a slot for the data record in the producer buffer and to serialize against the other producers and the consumer and to update the BytesUsed field to indicate the amount of data that will be in the producer buffer. In block 508, the producer determines whether the compare-double-and-swap operation was successful. If so, processing continues to block 510 (FIG. 5B), otherwise, processing continues to block 502 (FIG. 5A). In block 510, the producer moves the data record to the reserved slot. In block 512, the producer sets the READY flag to true (i.e., READY=true). In block 514, the producer determines whether the consumer is idle (i.e., goes to sleep while waiting for work). If so, processing continues to block 516, otherwise processing continues to block 518. In block 516, the producer notifies the consumer that the producer buffer has one or more data records. In certain embodiments, to reduce the overhead of cross-thread communication and dispatching, the decision to notify the consumer at this point may be conditional based on a configurable threshold, e.g., notify the consumer when a certain percentage of the buffer is full. In block 518, this thread continues to perform other processing.

In certain embodiments, the processing performed by the producer is logically inserted into an existing, original producer thread so that the processing becomes a part of the producer thread. In such embodiments, a producer thread starts the processing of FIG. 5 the receipt of the data record and then exits at block 518 so that the original producer thread may continue processing. The exit here means just continuation of the original producer thread.

In certain embodiments, there is a callable service (or class) with three subroutines (or functions or methods): INITIALIZE( )—which allocates buffers and creates the consumer thread, RECORD( )—which processes one record, and TERMINATE( ) which sets the "TERMINATE" flag checked in block 608. In such embodiments, FIG. 5 represents the RECORD( ) function and will end with an EXIT or RETURN.

In block 520, the producer determines whether the consumer is idle (i.e., goes to sleep while waiting for work). If so, processing continues to block 522, otherwise processing continues to block 524. In block 522, the producer notifies the consumer that the producer buffer has one or more data records. That is, when the producer has filled its slot, the producer notifies the consumer (e.g., via a POST operation) if the consumer is idle, which is indicated by the condition ConsumerBufferAnchor.BytesUsed=0 (i.e., the BytesUsed field of the ConsumerBufferAnchor composite field is zero). In block 524, the producer suspends all producers until space in the producer buffer becomes available. In certain embodiments, this is done by setting a SUSPENDED flag that will cause the producers to bypass the record processing or, optionally, to wait.

Thus, if the consumer is busy, then the producer continues to add data records to the producer buffer until the consumer becomes active or the producer buffer is full. The producer buffer overflow may be a standard exception. In certain embodiments, the producer may choose to dynamically allocate a new extent of the producer buffer and chain the new extent to the previous extent or the producer may choose to suspend producers until the buffer space becomes available. In certain embodiments, the BufferAnchor structure supports multiple extents. An extent may be described as an additional storage area allocated dynamically by a producer. The producer may decide to allocate a new extent (request storage allocation from the operating system) when the current producer buffer is full, nearly full or is anticipated shortly to become full based on various factors (e.g., a decision-making algorithm). Extents may be chained via a linked list to the initial buffer. A producer may also decide to unchain/deallocate some or all extents to free up unused storage based on various factors (e.g., a decision-making algorithm). The consumer may process the entire chain of extents sequentially, following the linked list pointers. In certain embodiments, each additional extent is the same size as the initial buffer size).

FIG. 6 illustrates, in a flow diagram, operations performed by a consumer in accordance with certain embodiments. FIG. 6 is formed by FIGS. 6A, 6B, 6C, and 6D. Control begins at block 600 with the consumer thread being initialized. In block 602, the consumer becomes idle (e.g., issues a timer wait, such as STIMER WAIT). In block 604, the consumer receives notification from a producer that the producer buffer has one or more data records or receives an indication that the timer expired. In block 606, the consumer determines whether the producer buffer is empty. If so, processing continues to block 608, otherwise, processing continues to block 610 (FIG. 6B). In block 608, the consumer determines whether to terminate. If so, processing continues to block 630, otherwise, processing continues to block 602. In block 630, the consumer is shut down and the two buffers are freed. From block 630, processing exits.

In block 610, the consumer issues a compare-double-and-swap operation to swap the consumer producer buffers. In certain embodiments, when the consumer buffer is empty, and the producer buffer is not empty, the consumer executes a compare-double-and-swap operation within a spin loop to switch pointers so that consumer can now access the buffer that the producers were filling (which is referred to as the consumer buffer after the switch) and produces can now fill the buffer that consumer emptied (which is referred to as the producer buffer after the switch).

Figure 6A:
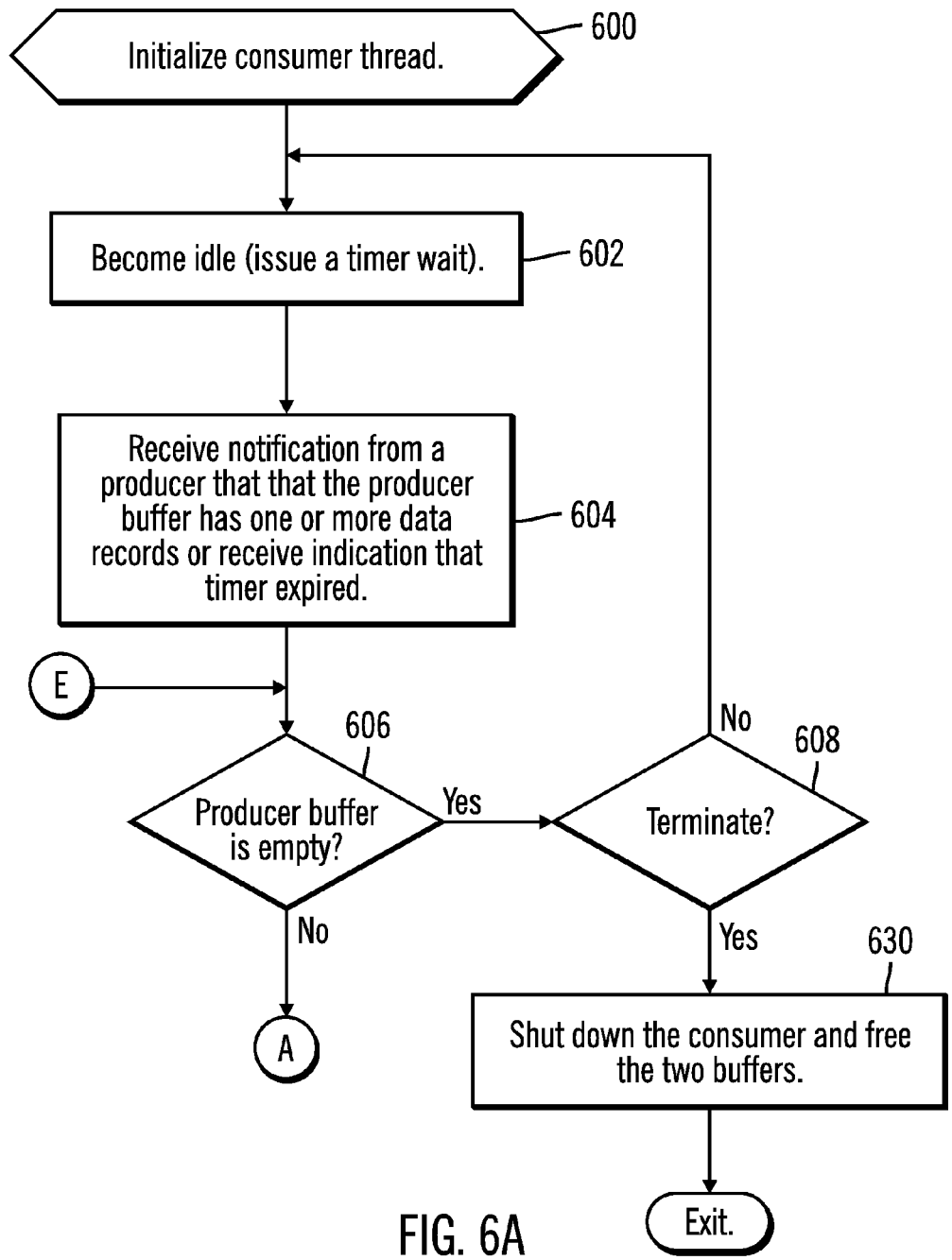
FIG. 6 illustrates, in a flow diagram, operations performed by a consumer in accordance with certain embodiments.
Figure 6B:
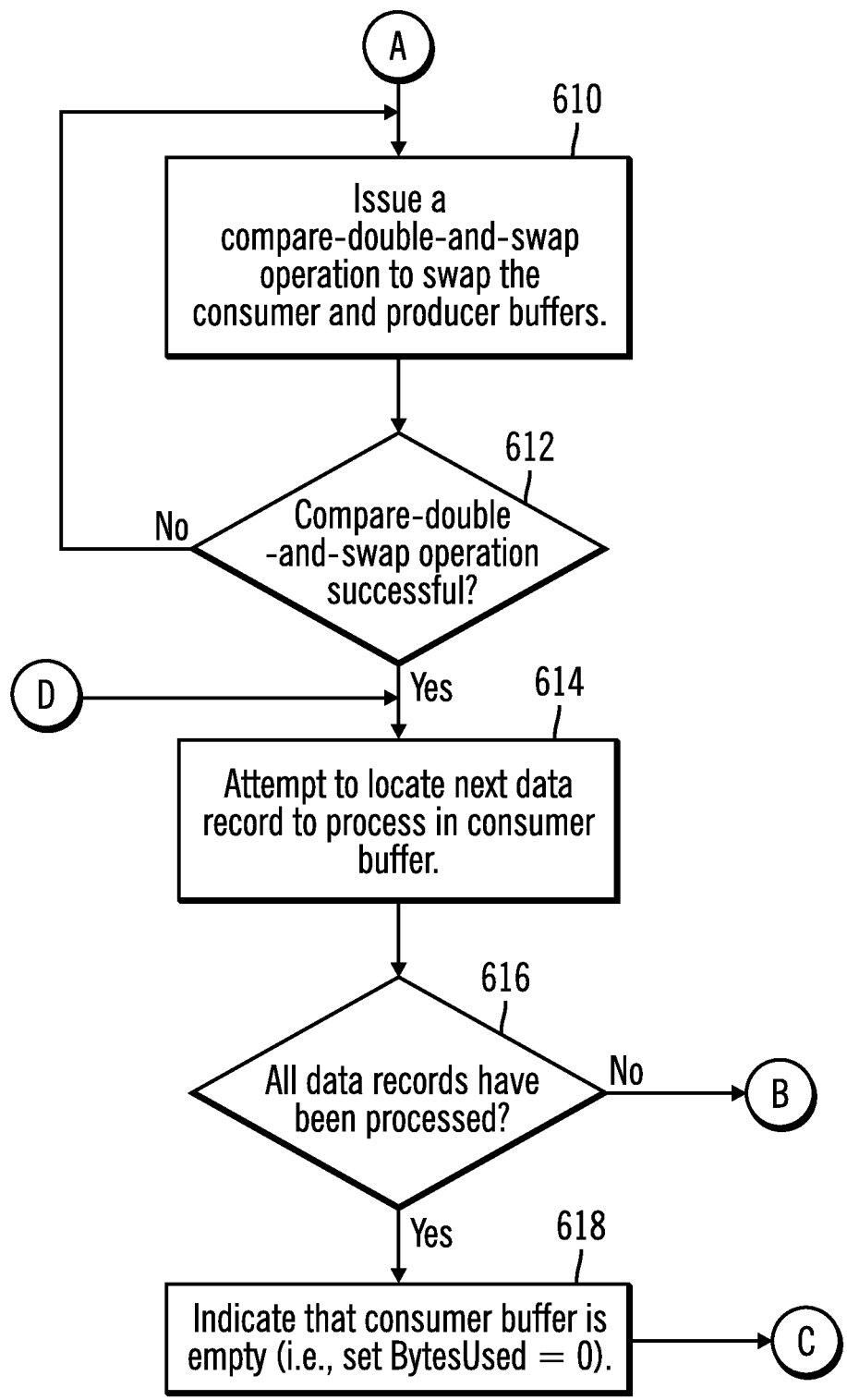
Figure 6C:
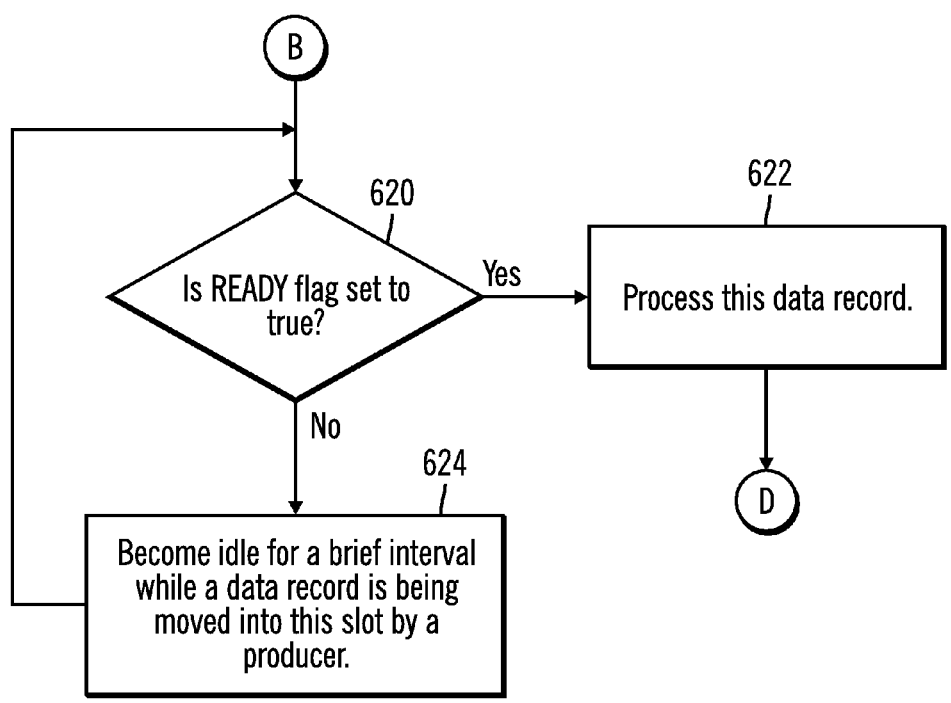
Figure 6D:
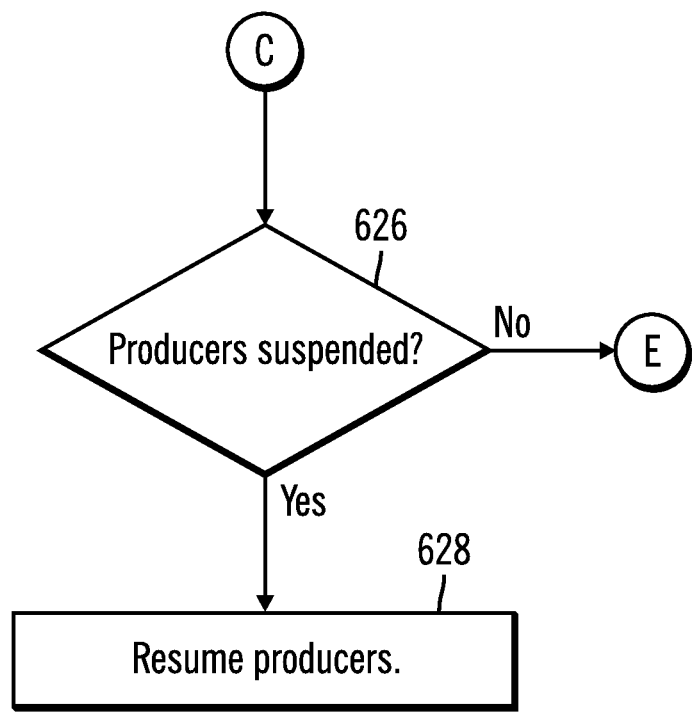

In block 612, the consumer determines whether compare-double-and-swap operation was successful. If so, processing continues to block 614, otherwise, processing continues to block 610. In block 614, the consumer attempts to locate the next data record to process in the consumer buffer. In block 616, the consumer determines whether all of the data records have been processed. If so, processing continues to block 618, otherwise, processing continues to block 620 (FIG. 6C). In block 618, the consumer indicates that the consumer buffer is empty (i.e., the consumer sets BytesUsed=0). From block 618, processing continues to block 626 (FIG. 6D).

In block 620, the consumer determines whether the READY flag is set to true. If so, processing continues to block 622, otherwise, processing continues to block 624. In block 622, the consumer processes the data record. In block 624, the consumer becomes idle for a brief interval while the data record is being moved into this slot by a producer, then processing continues to block 620.

In block 626, the consumer determines whether the producers are suspended. If so, processing continues to block 628, otherwise, processing continues to block 606 (FIG. A). In block 628, the consumer resumes the producers. In certain embodiments, this is done by unsetting the SUSPENDED flag and, if producers were waiting, notifying them to resume.

In certain embodiments, when the consumer becomes active (e.g., in response to a POST operation from a producer indicating that the producer buffer has one or more data records or upon a timer interval expiration), the consumer does the following:

1. Swaps the buffers via a compare-double-and-swap operation with serialization (e.g., if initially, producers were filling buffer(1), and the consumer was draining buffer(2), with the swap, the producers would be filling buffer(2), and the consumer would be draining buffer(1)).

2. Drains the contents of the consumer buffer by sequentially consuming the records from first to last until the last record has been processed; clears each processed buffer with zeros so that READY flag in every possible slot is reset to false.

3. Sets ConsumerBufferAnchor.BytesUsed=0.

4. At this point, if the producer buffer is not empty, then the consumer goes to 1, otherwise, the consumer becomes idle (e.g., issues a WAIT or STIMER WAIT).

Thus, the producers and the consumer alternate between the two buffers, so that one of the buffers fills while the other one drains at the same time.

In certain embodiments, a dual-buffer adaptive technique provides two buffers, at least one producer process, one consumer process, and two double pointers, each pointer containing an address of a buffer and a size of filled area in the buffer; provides the at least one producer process with a double pointer to one of the two buffers, and a consumer process with a double pointer to the other buffer; detects that one of two buffers is empty and the other buffer contains one or more data records and a consumer process is ready to process; executes a compare-double-and-swap operation within a spin loop to direct the consumer to process the buffer containing one or more data records and at least one producer process to process the empty buffer; and continues the process until the two buffers are empty.

In certain embodiments, a timer wait is issued by the consumer when both buffers are empty and operations are resumed when one or more data records are posted by a producer or when the timer wait interval has expired. In certain embodiments, the consumer process is configured with a variable wait timer interval. In certain embodiments, the at least one producer process is configured with a variable condition controlling the frequency of a POST to the consumer.

In this manner, embodiments reduce contentions between the consumer and the producers. Also, embodiments are tunable, with three independent parameters: buffer size, wait timer interval, and condition for POST issuance.

If a current producer buffer is not empty, the consumer flips the pointers to make the empty consumer buffer a producer buffer that is available to the producers. Now, the consumer drains the current consumer buffer (which was the producer buffer before the flip) with no contentions with the producers. When this consumer buffer is emptied, the consumer marks the consumer buffer as empty by nullifying the size of the filled area, then looks at the producer buffer. If the producer buffer is not empty, the consumer flips the pointers again so the above process continues until both buffers are empty. When both buffers are empty, the consumer becomes idle.

In certain embodiments, a contention with producers may occur when flipping buffers. The frequency of contentions may be tuned by varying the timer interval and/or the conditions when a producer issues a POST operation.

In certain embodiments, a single compare-double-and-swap operation within a spin loop is used in conjunction with a double pointer operand to perform all of the following distinct functions automatically and simultaneously:

a) on the producer side, reserve a space for the current record and update a pointer to next available space;

b) on the producer side, pick up a pointer to the beginning of a buffer and a pointer to next available space; and c) on the consumer side, swap the buffers between producers and consumer, update the buffer status to empty, and update the pointer to next available space.

In certain embodiments, for the cases in which a buffer swap has occurred while a data record move operation initiated by a producer was still in progress, the record header has a READY flag that the producer sets to true once the move operation has completed. When the consumer encounters a record that is not READY, the consumer has two configurable options:

a) if the incoming records are to be processed in the same order as they are in the buffer, the consumer pauses for a pre-set time interval (STIMER WAIT) if a record is encountered that is not READY; and, upon the timer expiration, the consumer loops back to check the READY flag again until the ready flag equals true (i.e., is READY) (this time interval may be configurable or self-tuned based on workload); or b) if the processing order does not matter, the consumer may skip any record that is not READY; after the last record has been processed and any records were found not READY, the consumer may loop back to scan the buffer and process any records that are now READY; and the looping may continue until all records are processed.

In addition, embodiments provide two more independent tuning controls, for additional flexibility. First, when the consumer is idle, the consumer may be notified that a producer buffer has one or more data records by a producer at any time as soon as a configurable condition "need-to-post" is met, even if the buffer is not full. This provides a self-tuning capability that may be used to avoid a buffer shortage situation during peak workloads. Moreover, a POST operation may also be issued to the consumer by any other thread (e.g., to force processing of the buffered one or more data records immediately before a pending shutdown). Second, when the consumer is idle, the consumer may be woken up either by a POST from a producer or by the system when a pre-set timer wait interval has expired. This wait interval is another configurable variable that may also be self-tuned at run time depending on workload.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flow diagram (i.e., flowchart) illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowcharts illustration, and combinations of blocks in the block diagrams and/or flowcharts illustration, can be implemented by special purpose hardware-based systems that perform the specified functions or acts, or combinations of special purpose hardware and computer instructions.

In addition, the illustrated operations of the flow diagrams and block diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Figure 7:
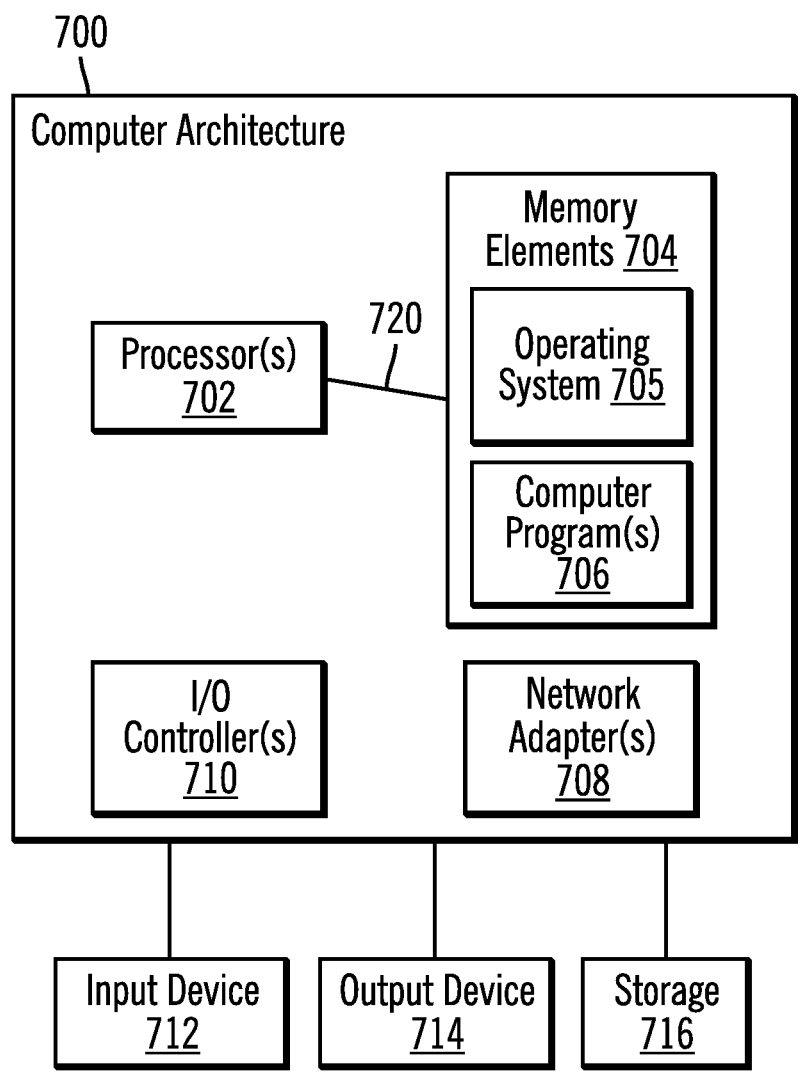
FIG. 7 illustrates, in a block diagram, a computer architecture that may be used in accordance with certain embodiments.

FIG. 7 illustrates a computer architecture 700 that may be used in accordance with certain embodiments. In certain embodiments, computing device 100 may implement computer architecture 700. The computer architecture 700 is suitable for storing and/or executing program code and includes at least one processor 702 coupled directly or indirectly to memory elements 704 through a system bus 720. The memory elements 704 may include local memory employed during actual execution of the program code, bulk storage, and cache memories which provide temporary storage of at least some program code in order to reduce the number of times code must be retrieved from bulk storage during execution. The memory elements 704 include an operating system 705 and one or more computer programs 706.

Input/Output (I/O) devices 712, 714 (including but not limited to keyboards, displays, pointing devices, etc.) may be coupled to the system either directly or through intervening I/O controllers 710.

Network adapters 708 may also be coupled to the system to enable the data processing system to become coupled to other data processing systems or remote printers or storage devices through intervening private or public networks. Modems, cable modem and Ethernet cards are just a few of the currently available types of network adapters 708.

The computer architecture 700 may be coupled to storage 716 (e.g., any type of storage device; a non-volatile storage area, such as magnetic disk drives, optical disk drives, a tape drive, etc.). The storage 716 may comprise an internal storage device or an attached or network accessible storage. Computer programs 706 in storage 716 may be loaded into the memory elements 704 and executed by a processor 702 in a manner known in the art.

The computer architecture 700 may include fewer components than illustrated, additional components not illustrated herein, or some combination of the components illustrated and additional components. The computer architecture 700 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method, comprising:
under control of a consumer:
   determining, with a processor of a computer, that a first buffer is empty and that a second buffer contains data, wherein the first buffer has a double-pointer, and wherein the second buffer has a double pointer;
   executing a first compare-double-and-swap operation within a spin loop, wherein the executing includes swapping the double pointer of the first buffer and the double pointer of the second buffer;
   draining the second buffer by:
      in response locating a next data record in the second buffer, processing the next data record; and
      in response to determining that there are no more data records to be processed in the second buffer and that multiple producers are suspended, resuming the multiple producers; and
under control of at least one producer of the multiple producers, filling the first buffer by:
   in response to determining that there is enough room for a data record in the first buffer, executing a second compare-double-and-swap operation within a spin loop, wherein executing the second compare-double-and-swap operation includes atomically locating the first buffer and updating the double pointer of the first buffer to reserve a slot for a data record in the first buffer;
   in response to determining that there is not enough room for the data record and determining that the consumer is idle, notifying the consumer; and
   in response to determining that there is not enough room for the data record and determining that the consumer is not idle, suspending the multiple producers.

2. The method of claim 1, wherein the consumer and the at least one producer share the first buffer and the second buffer without using lock requests.

3. The method of claim 1, wherein the consumer sets an indicator to indicate that the second buffer is drained and further comprising:
executing a third compare-double-and-swap operation within a spin loop to swap the double pointer of the second buffer and the double pointer of the first buffer to direct the consumer to drain the first buffer and the at least one producer to fill the second buffer.

4. The method of claim 1, wherein the consumer is configured with a wait timer to become idle for a period of time.

5. The method of claim 1, wherein the at least one producer is configured with a condition controlling a frequency of issuing POST operations to the consumer to notify the consumer that one of the first buffer and the second buffer contains data.

6. The method of claim 1, further comprising:
under control of the at least one producer:
   in response to moving the data record to the reserved slot, setting a ready flag to true; and
under control of the consumer;
   in response to processing the data record, determining that there are more data records, and determining that the ready flag is set to true, processing another data record; and
   in response to processing the data record, determining that there are more data records, and determining that the ready flag is not set to true, becoming idle.

* * * * *